Figures 1, 2, 3:
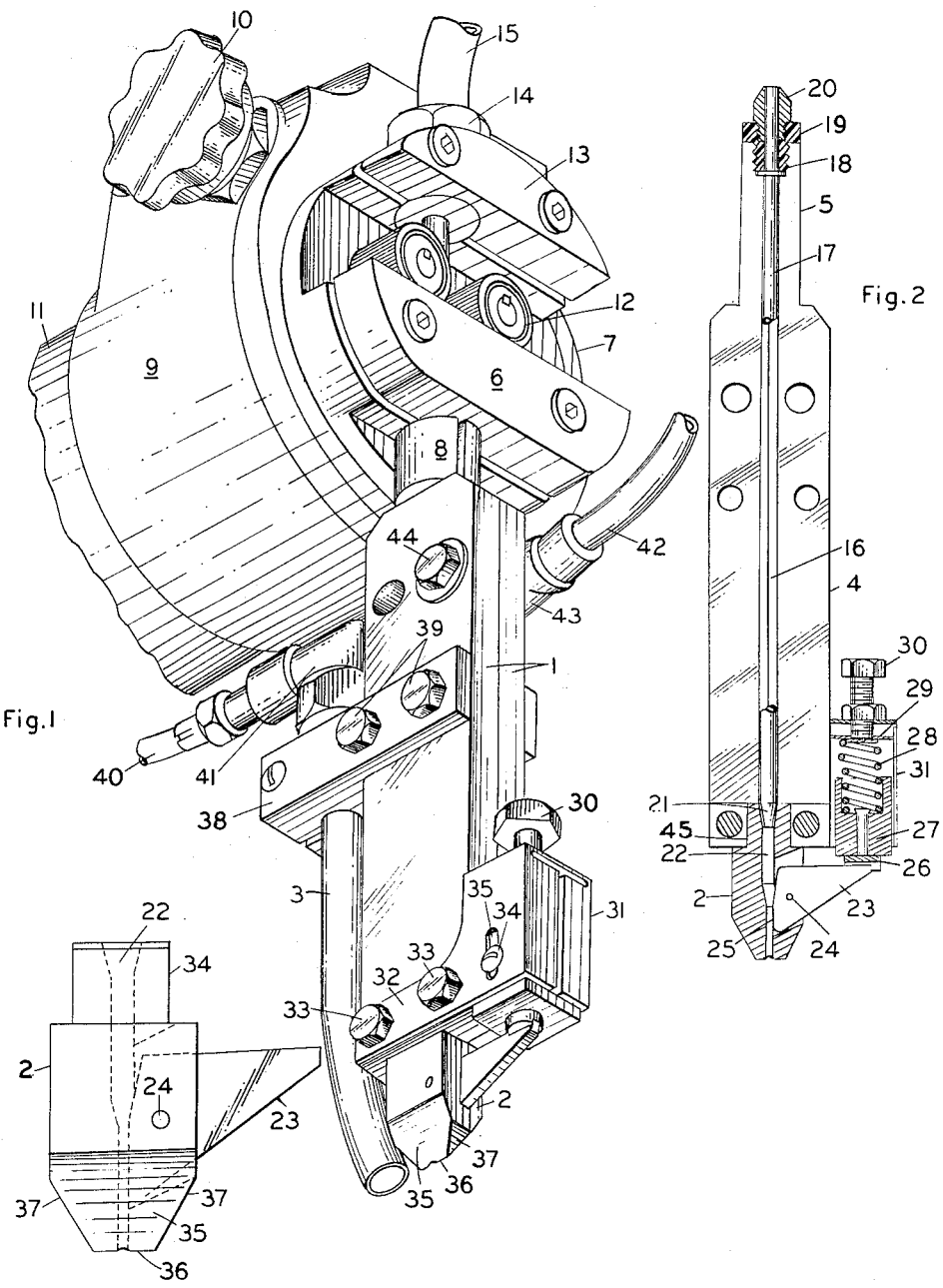

Inventor:
Alanson U. Welch
by Leslie C. Bryer
His Attorney

United States Patent Office 2,966,577
Patented Dec. 27, 1960

2,966,577
ARC WELDING TORCH
Alanson U. Welch, York, Pa., assignor, by mesne assignments, to Air Reduction Company, Incorporated, New York, N.Y., a corporation of New York
Filed Nov. 14, 1957, Ser. No. 696,512
5 Claims. (Cl. 219—130)

My invention relates to automatic arc welding and more particularly to an arc welding torch of improved construction for use in automatic arc welding.

In fusion welding a heating agency, which may for example be a gas flame or an electric arc, is supported and directed along a line of welding by means commonly referred to as a torch. In automatic arc welding this torch acts primarily as an electrode guide and is associated with a wire-feeding device which supplies the electrode material through the torch to the work in accordance with its consumption in the arc. Sometimes as in gas-arc welding the torch also embodies means for supplying a shielding gas about the arcing terminal of the electrode and the molten portions of the electrode and the work.

Means usually is provided in an arc welding torch for supplying welding current to the electrode during its passage therethrough. Such means is usually associated with the discharge end of the torch and is often referred to as a nozzle. Such nozzles are usually made detachable from the torch body so that they may be replaced when their utility has been impaired because of their exposure to wear occasioned by the sliding engagement of an electrode with the parts thereof used for supplying welding current to the electrode. It is consequently desirable to provide a torch nozzle whose electrode engaging parts are arranged to accommodate themselves to the wear to which they are subjected by the passage of an electrode through the torch so that their useful life is increased and the inconvenience and expense connected with their frequent renewal is avoided.

Another inconvenience associated with arc welding is due to the spray of small globules of molten metal that is projected from the welding area during an arc welding operation. This discharge of weld metal is referred to as weld spatter and the amount thereof will vary depending on welding conditions. This weld spatter will adhere to objects engaged thereby and its attachment to the welding torch and the nozzle thereof is quite objectionable. For example, when arc welding ferrous parts in a shielding atmosphere of carbon dioxide, I have found that the flat end portion of a nozzle tip ⅜ inch in diameter will accumulate a ⅛ inch thick layer of weld spatter within the first minute or two of a welding operation.

It is an object of my invention to provide an arc welding torch having a nozzle which by reason of its construction is resistant to the accumulation of weld spatter thereon.

It is also an object of my invention to provide an arc welding torch having a nozzle in which the electrode current supply means thereof accommodates itself to conditions produced by the abrasion of the electrode frictionally engaged thereby during its passage through the nozzle.

Other objects of my invention will become apparent from the following description of one embodiment thereof shown in the accompanying drawing.

In this drawing:

Fig. 1 is a perspective view of my torch showing its mounting on the face plate of an automatic arc welding head, Fig. 2 is a longitudinal sectional view of my torch showing structural features thereof, and Fig. 3 is a side view of the tip portion of my welding torch.

In the embodiment of my invention shown in the accompanying drawing the welding torch has an electrically conductive body portion provided with a longitudinal electrode passageway which terminates at one end in a socket in which the shank of a nozzle of electrically conductive material is releasably clamped with the longitudinal electrode passageway thereof in alignment with the electrode passageway in the torch body. The end of the torch opposite its nozzle end is provided with a reduced portion or shank by means of which it may be supported in a clamp forming part of an automatic arc welding head. The torch nozzle has a wedge-shaped tip the side surfaces of which are inclined at a sharp angle to the terminal portion of the electrode passageway therethrough and intersect one another to form at the end of the nozzle a sharp edge which extends a substantial distance in opposite directions from the discharge end of this passageway. Weld spatter engaging the inclined surfaces of this nozzle tip bounce off of it without adhering thereto and I have found that the smoother these surfaces are made, the better this action takes place. The sharp edge at the tip of the nozzle also prevents an accumulation of weld spatter thereon.

The torch nozzle also has an end wall slot spaced from its tip and extending into its electrode passageway which at the slot is of substantially the same cross-sectional area as the electrode to be fed therethrough in sliding engagement therewith. An elongated plate-like pressure shoe is mounted in this slot and has a width no greater than the width of the electrode passageway so that it can follow in pressure engagement with an electrode in this passageway as the electrode, by wear occasioned by its sliding engagement with this passageway, increases the depth of the grooved portion of the passageway which is opposite the slot. Resilient means mounted on the torch acts on the pressure shoe to bias it into sliding engagement with the electrode in its nozzle passageway. The direction of electrode wear in the nozzle is aligned with the sharp edge of the nozzle tip so that considerable wear can take place without having the terminal portion of the electrode passageway issue, due to wear, from the side of the tip instead of from its end. Welding current is supplied through the torch body and its nozzle to the electrode which is in sliding engagement with the nozzle.

My invention will be more fully understood from a conclusion of the following detailed description of the arc welding torch shown in the accompanying drawing in which the several features of my invention have been embodied. The torch there shown is of the type used for performing a gas-arc welding operation in which the arcing terminal of the electrode and the molten portions of the electrode and the work are shielded from the surrounding atmosphere by a gas.

The torch 1 has a body portion which terminates at its lower end in a nozzle structure 2 and has supported thereon a gas tube 3 which extends lengthwise of the body portion of the torch and has its discharge end located adjacent the tip of the nozzle 2. The torch 1 forms part of an automatic arc welding head and is supported at its upper end from a structural part of a wire-feeding device which may for example have the construction shown in the application of James T. Catlett, Serial No. 589,220, filed June 4, 1956, for "Arc Welding Head," and assigned to the assignee hereof.

The body portion of the torch is formed of two complementary parts or blades 4, one of which is shown in Figure 2 and which, when assembled and bolted together, provide a longitudinal passageway through which the electrode is fed to the nozzle 2. The upper end of the torch body is provided with a cylindrical end portion 5 which forms a tang by means of which the torch is supported in a clamp 6 mounted on the face plate 7 of the wire-feeding device. A cylindrical split sleeve 8 of insulating material is interposed between the tang portion 5 of the torch and the parts of the clamp 6 in order to electrically insulate the torch from the wire-feeding device. The face plate 7 of this wire-feeding device is adjustable about an axis of rotation at right angles to the longitudinal electrode passageway in the torch body by means of a mechanism enclosed within the gear housing 9 of the wire-feeding device and actuated by a hand wheel 10 projecting from the side of the gear housing. The gear housing also forms a support for an electric feed motor 11 whose shaft is connected through gearing in housing 9 to the feed rolls 12 of the wire-feeding device. A second clamp 13 also mounted on the face plate 7 of the wire-feeding device provides a support for the coupling member 14 of a hose 15 through which the welding electrode is supplied between the feed rolls 12 by which it is propelled through the torch 1.

Each of the half portions 4 of the body 1 of the torch is provided with a longitudinal V-shaped groove 16 which in combination constitute the longitudinal passageway through the torch body. This two-part construction of the nozzle body is employed for ease of manufacture since it would be much more expensive to drill the longitudinal passageway through a one-piece body construction. In order to accommodate the electrode passageway for electrodes of different size, a guide tube 17 is provided therein for electrodes of the smaller sizes. This guide tube 17 is provided at its upper end with a collar 18 which is seated against the bottom of a threaded recess in the upper end of the torch body and is held in place therein by a threaded insulator 19 provided for closing this recess. A metallic wire guide 20 is slipped over the upper end of this guide tube and makes a threaded engagement with the threaded insulating bushing 19. The lower end 21 of the guide tube 17 is bevelled and fits into a bevelled end portion of the electrode passageway 22 in nozzle 2. By reason of the construction employed, it is believed to be apparent that without disassembling the torch body, the guide tube 17 may be withdrawn therefrom in order to increase the size of the longitudinal electrode passageway therein by removing the bushing 19 and withdrawing the guide tube 17 from the top of the torch body. Thereafter the bushing 19 and its wire guide 20 can be reinserted in order to complete the combination for feeding electrodes of larger sizes.

The nozzle 2 is provided with a plate-like pressure shoe 23 which is pivoted at 24 in a slot which is spaced from the tip of the nozzle 2. The pressure shoe 23 makes a snug fit in the slot and the electrode engaging portion 25 thereof is movable into sliding engagement with a substantial length of the electrode fed through the passageway 22 of the nozzle. The width of this shoe 23 is no greater than the width of the electrode passageway through the nozzle so that it can follow in pressure engagement with the electrode in the passageway as the electrode, by wear occasioned by its sliding engagement with the passageway, increases the depth of the grooved portion of the passageway which is opposite the side wall slot in the nozzle for this pressure shoe 23.

The pressure shoe 23 has a projecting arm which is engaged by resilient means mounted on the body portion of the torch, electrically insulated therefrom and acting on the pressure shoe to bias it into engagement with an electrode in the passageway extending through the nozzle. In the particular arrangement illustrated, the pressure arm of the shoe 23 is engaged by a slotted metallic button 26 which is swivel-mounted in an insulating block 27, which provides a seat for the lower end of a coil spring 28 whose upper end is engaged by a guide plate 29 which is held in pressure engagement with the spring by an adjusting screw 30. The insulating block 27, spring 28 and guide plate 29 are contained within a holder 31 which constitutes a support for the adjusting screw 30. This holder 31 may be formed of sheet metal and provided with arms 32 which straddle the lower end of the torch body on which it is supported by means of through bolts 33. A screw 34 extending through a slot 35 in the holder 31 and engaging the insulating block 27 may be employed for holding the parts in assembled relationship when the nozzle 2 is removed from the lower end of the torch body. The nozzle 2 is provided with a shank 45 which is inserted in a socket formed in the lower end of the torch body and the through bolts 33 bring the two parts of the torch body into clamping engagement with this shank to hold the nozzle in position at its lower end. It is of course apparent that by loosening the through bolts 33, the nozzle 2 may be removed for replacement with another nozzle for a different size electrode or for replacement when, due to wear, it becomes necessary to provide another nozzle.

The nozzle 2 has a wedge-shaped tip the side surfaces 35 of which are inclined at a sharp angle to the terminal portion of the electrode passageway through the nozzle and intersect one another to form at the end of the nozzle a sharp edge 36 which extends a substantial distance in opposite directions from the discharge end of the electrode passageway in the nozzle. In use the nozzle is supported in the torch body so that this sharp edge portion 36 extends along the line of welding. With the arrangement of nozzle parts just described, it is apparent that wear of the electrode passageway due to the abrasion of the electrode passing therethrough can elongate the passageway in the direction of the knife edge without having the electrode issue from the side of the nozzle. The sharp edge 36 of the nozzle also prevents any accumulation of weld spatter on the end of the nozzle and the steeply sloping sides 35 thereof causes any weld spatter engaging these surfaces to bounce off without adherence thereto. The effectiveness of the side surfaces 35 for their intended purpose requires that they be made as smooth as possible and I have found it desirable to chromium plate the whole surface and to highly polish the same in order to enhance this functional advantage of these inclined surfaces. I have found that if the angle between these inclined surfaces is about 60°, very satisfactory operation is obtained. The two ends of the nozzle are bevelled as at 37 to prevent interference with the work or the work clamps and also to provide clearance for the discharge end of the gas tube 3 and the gas stream issuing therefrom.

The gas tube 3 extends lengthwise of the body portion of the torch 1 and is held in place thereon by clamps 38 having complementary portions surrounding and holding the gas tube 3 and arms which are attached to the torch body by means of bolts 39. The upper end of the gas tube 3 is connected with a gas hose 40 through a coupling 41 which includes an adapter, reducer and elbow member which latter is provided with a clamp nut for making a conventional flared tube compression fitting with the upper end of gas tube 3.

The gas tube 3 is usually located in a leading position when welding, that is, it precedes the electrode when the electrode is moved across the work. For some applications, however, it may be used in the opposite direction. The gas tube tends to pick up weld spatter but this is reduced by making it of thin walled tubing and grinding its discharge end to a knife edge and chromium plating it. Any collection of weld spatter inside of this gas tube will usually drop out without interfering with the welding operation even when the tube is in a leading position relative to the arc.

Welding current is supplied to the torch through a welding cable 42 having a terminal 43 which is attached by a bolt 44 to the torch body. Current supplied through welding cable 42 is supplied through the torch body 1 to the nozzle 2 each of which are made of electrically conducting material. The body portion of the torch is preferably formed of copper and the nozzle of a hard alloy of copper such as an alloy of copper and beryllium such as is commonly used for resistance welding electrodes. It is of course obvious that the nozzle should be made of a hard material in order to resist wear due to abrasion of an electrode passing therethrough. Since the tip is preferably made of a hard material, it may preferably be made of two cast parts which are permanently riveted together instead of employing the one-piece construction shown in the drawing. Machining a nozzle tip of this shape with the bevels, holes, slots, etc., out of a hard alloy is very slow and expensive and fabricating the nozzle out of precision castings with all the contours cast therein will avoid this expense.

It is of course apparent that my welding torch may be variously modified without departing from the spirit and scope of my invention. It is consequently to be understood that I claim all such modifications as common within the true spirit and scope of my invention.

What I claim as new and desire to secure by Letters Patent of the United States is:

1. Welding apparatus comprising an electrically conductive nozzle for supplying welding current to a welding electrode, said nozzle having a sidewall slot extending lengthwise of a grooved portion of an electrode passageway which extends lengthwise through said nozzle and is of substantially the same cross-sectional area as the electrode to be fed therethrough, and means including a pressure shoe located within said slot directly opposite said grooved portion of said passageway and movable into sliding engagement with an electrode in said passageway for pressing said electrode into sliding engagement with said grooved portion of said passageway opposite said sidewall slot, said shoe having for a substantial depth at its electrode engaging portion a width no greater than the width of said electrode passageway so that said shoe can follow in pressure engagement with said electrode in said passageway as said electrode by wear increases the depth of said grooved portion of said passageway which is opposite said slot and said pressure shoe.

2. Welding apparatus comprising an electrically conductive nozzle for supplying welding current to a welding electrode, said nozzle having a longitudinal electrode passageway therethrough which has a grooved portion of substantially the same cross-sectional area as the electrode to be fed therethrough and a sidewall slot spaced from its tip and extending lengthwise of said grooved portion of said passageway and of substantially the same width as said passageway, and means including an elongated plate-like pressure shoe making a snug fit in said slot and movable into sliding engagement with a substantial length of electrode in said passageway for pressing said electrode into sliding engagement with said grooved portion of said passageway opposite said sidewall slot, said shoe having a width which is no greater than the width of said electrode passageway so that it can follow in pressure engagement with said electrode in said passageway as said electrode by wear increases the depth of said grooved portion of said passageway which is opposite said slot and said pressure shoe.

3. A welding torch having an electrically conductive body portion with a longitudinal electrode passageway therethrough; an electrically conductive nozzle having lengthwise thereof a longitudinal electrode passageway which is of substantially the same cross-sectional area as the electrode to be fed therethrough and has a grooved portion opposite a sidewall slot which extends into said nozzle passageway lengthwise of its said grooved portion; an elongated plate-like pressure shoe in said slot, said shoe having a width no greater than the width of said nozzle passageway and being movable in said slot into sliding engagement with a substantial length of an electrode in said nozzle passageway for pressing it into sliding engagement with said grooved portion of said nozzle passageway which is opposite said slot; resilient means mounted on said body portion of said torch, electrically insulated therefrom, and acting on said pressure shoe in said nozzle slot to bias it into sliding engagement wtih an electrode in said nozzle passageway; means for detachably mounting said nozzle on the end of said body portion of said torch in electrically conductive relation therewith and with the electrode passageway therethrough in alignment with the electrode passageway in the body portion of said torch; and means for supplying welding current to the body portion of said torch.

4. A welding torch having an electrically conductive body portion with a longitudinal electrode passageway therethrough; an electrically conductive nozzle having therethrough a longitudinal electrode passageway which is of substantially the same cross-sectional area as the electrode to be fed therethrough and which has a grooved portion opposite a sidewall slot which extends into said nozzle passageway lengthwise of its said grooved portion and is of substantially the same width as said nozzle passageway, said nozzle also having a wedge-shaped tip the inclined side surfaces of which are on opposite sides of said nozzle slot and intersect one another to form at the end of said nozzle a sharp edge which extends across the end of said nozzle passageway in the same direction that said nozzle slot extends into said nozzle passageway, an elongated plate-like pressure shoe which is of substantially the same width as said nozzle slot in which it is located and by which it is guided into sliding engagement with a substantial length of an electrode in said nozzle passageway; resilient means mounted on said body portion of said torch, electrically insulated therefrom and acting on said pressure shoe to bias it in the direction of its said guide slot into sliding engagement with an electrode in said nozzle passageway and press said electrode into sliding engagement with said grooved portion of said nozzle passageway which is opposite said slot and in which electrode wear is directed by said slot guided shoe to elongate said nozzle passageway lengthwise of said sharp edge at the end of said nozzle, means for detachably mounting said nozzle on the end of said body portion of said torch in electrically conductive relation therewith and with the electrode passageway therethrough in alignment with the electrode passageway in the body portion of said torch; and means for supplying welding current to the body portion of said torch.

5. Welding apparatus comprising a nozzle having a wedge-shaped tip and a longitudinal electrode passageway extending through said tip, said tip having side surfaces which are inclined at a sharp angle to one another and intersect to form at the end of said nozzle a sharp edge which is directed across the discharge end of said electrode passageway, and a pressure shoe located in said nozzle and biased into sliding engagement with an electrode in said passageway in the same direction that said sharp edge extends across the discharge end of said passageway to place said electrode in sliding engagement with that portion of said passageway which is opposite said shoe so that the groove worn into said passageway by said electrode passing therethrough increases in depth lengthwise of said sharp edge and said electrode continues to issue from the end of said tip at said sharp edge, said shoe having at its electrode engaging portion a width no greater than the width of the groove worn by said electrode in said passageway so that it can follow in pressure engagement with said electrode as the depth of said groove increases.

References Cited in the file of this patent

UNITED STATES PATENTS

| | | |
|---|---|---|
| 2,179,108 | Westberg | Nov. 7, 1939 |
| 2,327,929 | Quigley | Aug. 24, 1943 |
| 2,347,646 | Smith | May 2, 1944 |
| 2,824,213 | Shearer et al. | Feb. 18, 1958 |
| 2,839,666 | Launder et al. | June 17, 1958 |